United States Patent
Poteet

(10) Patent No.: US 11,294,543 B2
(45) Date of Patent: Apr. 5, 2022

(54) PRESENTATION APPLICATION TOOL SYSTEMS AND METHODS

(71) Applicant: Advanced Solutions Visual Collaboration Systems, LLC, Louisville, KY (US)

(72) Inventor: Tyler Poteet, Louisville, KY (US)

(73) Assignee: Advanced Solutions Visual Collaboration Systems, LLC, Louisville, KY (US)

(*) Notice: Subject to any disclaimer, the term of this patent is extended or adjusted under 35 U.S.C. 154(b) by 0 days.

(21) Appl. No.: 16/782,169

(22) Filed: Feb. 5, 2020

(65) Prior Publication Data
US 2020/0257419 A1    Aug. 13, 2020

Related U.S. Application Data

(60) Provisional application No. 62/804,287, filed on Feb. 12, 2019.

(51) Int. Cl.
*H04W 12/06* (2021.01)
*G06F 3/0484* (2022.01)
*G09B 5/02* (2006.01)
*G06F 3/0481* (2022.01)

(52) U.S. Cl.
CPC .......... *G06F 3/0484* (2013.01); *G06F 3/0481* (2013.01); *G09B 5/02* (2013.01); *H04W 12/06* (2013.01)

(58) Field of Classification Search
CPC ................................................ G06F 16/9537
See application file for complete search history.

(56) References Cited

U.S. PATENT DOCUMENTS

| 2008/0254434 | A1 | 10/2008 | Calvert | |
|---|---|---|---|---|
| 2010/0257456 | A1 | 10/2010 | Lieb et al. | |
| 2012/0278738 | A1* | 11/2012 | Kruse | G06Q 10/10 715/754 |
| 2014/0047022 | A1 | 2/2014 | Chan et al. | |
| 2015/0138213 | A1* | 5/2015 | Turner | G06F 3/0485 345/520 |

(Continued)

FOREIGN PATENT DOCUMENTS

WO    2016183261 A1    11/2016

OTHER PUBLICATIONS

International Search Report & Written Opinion for corresponding PCT/US2020/016701 dated May 5, 2020.

*Primary Examiner* — Di Xiao
(74) *Attorney, Agent, or Firm* — Dinsmore & Shohl, LLP

(57) ABSTRACT

Methods and systems of using a presentation application tool include inputting a control code associated with an administrative control via the presentation application tool and a graphical user interface (GUI) of an administrative device, controlling a presentation device via the administrative device based on the control code, and setting an active user through the administrative control via the GUI of the administrative device, wherein the active user is in control of a present mode and an active user device. The method may further include associating the active user device with the present mode and the presentation device, the present mode configured to control the presentation device, and controlling a presentation screen of the presentation device in the present mode through the active user device.

15 Claims, 16 Drawing Sheets

(56) References Cited

U.S. PATENT DOCUMENTS

2015/0278930 A1* 10/2015 Potucek ................. G06Q 30/02
　　　　　　　　　　　　　　　　　　　　　　　705/26.61
2017/0140658 A1* 5/2017 Aluvala .............. H04L 65/4076
2018/0097856 A1* 4/2018 Dange .................... H04L 67/10

* cited by examiner

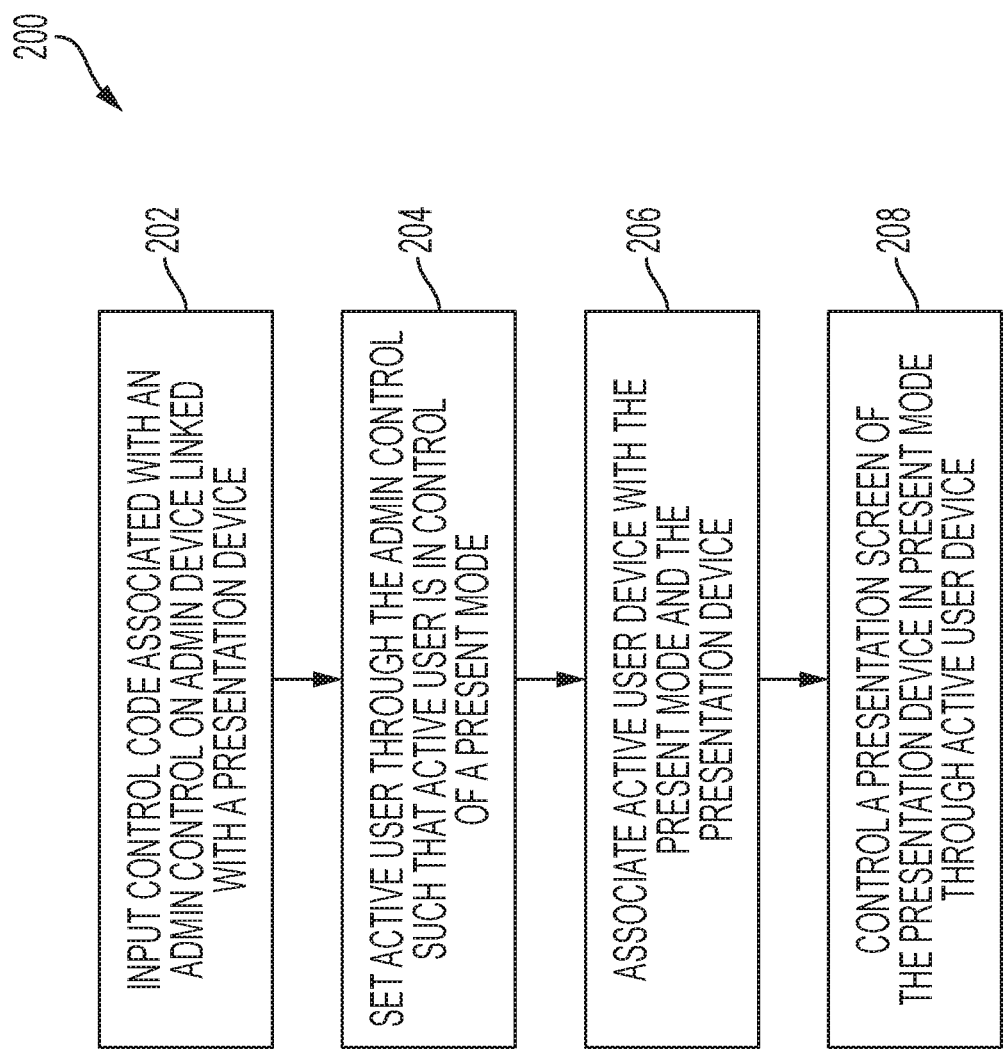

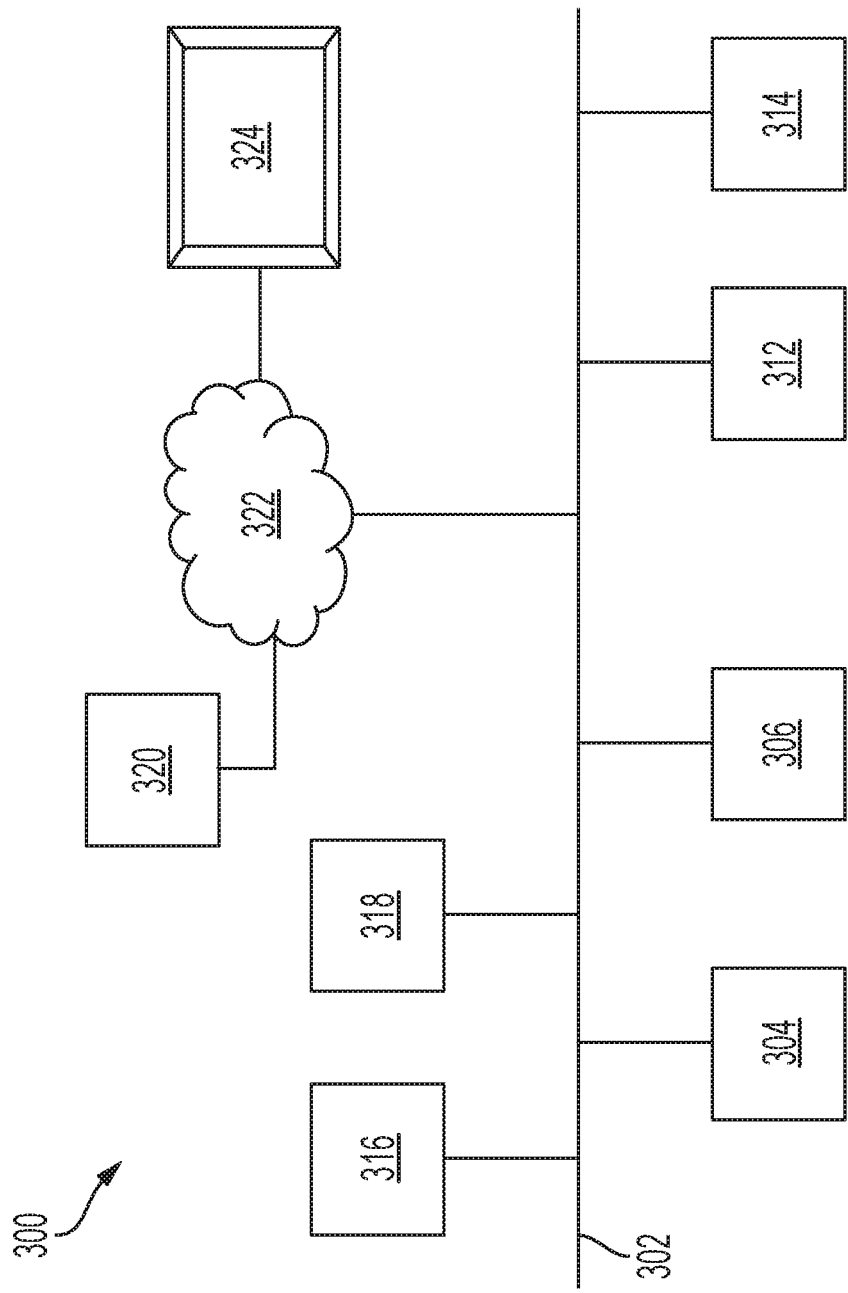

PRESENTATION APPLICATION TOOL SYSTEMS AND METHODS

CROSS-REFERENCE TO RELATED APPLICATIONS

The present disclosure claims the benefit of U.S. Provisional Patent Application Ser. No. 62/804,287, entitled PRESENTATION APPLICATION TOOL SYSTEMS AND METHODS, filed Feb. 12, 2019, the entirety of which is incorporated by reference herein.

TECHNICAL FIELD

The present disclosure relates to a presentation application tool and, in particular, a present application tool for a streamlined presentation selection on a centralized platform.

BACKGROUND

Presentation tools allows for users to present a prepared presentation to an audience. Often, when there are multiple presenters, the presentations are loaded from separate, de-centralized sources resulting in a delay in presentation setup and/or incompatibility between the de-centralized sources. Accordingly, a need exists for an alternative presentation tool resulting in an expedited presentation setup and compatibility.

BRIEF SUMMARY

According to the subject matter of the present disclosure, a method of using a presentation application tool may include inputting a control code associated with an administrative control via the presentation application tool and a graphical user interface (GUI) of an administrative device, controlling a presentation device via the administrative device based on the control code, and setting an active user through the administrative control via the GUI of the administrative device, wherein the active user is in control of a present mode and an active user device. The method may further include associating the active user device with the present mode and the presentation device, the present mode configured to control the presentation device, and controlling a presentation screen of the presentation device in the present mode through the active user device.

According to another embodiment, a method of using a presentation application tool may include inputting a control code associated with an administrative control via the presentation application tool and a graphical user interface (GUI) of an administrative device, verifying the control code to generate a successful verification, controlling a presentation device via the administrative device based on the control code and the successful verification, and setting an active user through the administrative control via the GUI of the administrative device, wherein the active user is in control of a present mode and an active user device. The method may further include associating the active user device with the present mode and the presentation device, the present mode configured to control the presentation device, and controlling a presentation screen of the presentation device in the present mode through the active user device. The administrative device may be controlled by one or more administrative users.

According to yet another embodiment, a system may include a presentation application tool, an administrative device comprising a graphical user interface (GUI) and communicatively coupled to the presentation application tool, a presentation device communicatively coupled to the presentation application tool, an active user device communicatively coupled to the presentation application tool, a processor communicatively coupled to the presentation application tool, and a non-transitory computer-readable memory storing instructions. When executed by the processor, the instructions may cause the processor to input a control code associated with an administrative control via the presentation application tool and the GUI of the administrative device, control the presentation device via the administrative device based on the control code, set an active user through the administrative control via the GUI of the administrative device, wherein the active user is in control of a present mode and the active user device, associate the active user device with the present mode and the presentation device, the present mode configured to control the presentation device, and control a presentation screen of the presentation device in the present mode through the active user device.

Although the concepts of the present disclosure are described herein with primary reference to a classroom setting of an educational institute, it is contemplated that the concepts will enjoy applicability to any setting for purposes of presenting a presentation, such as a business setting or otherwise.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 15 illustrates a flowchart process for use of the presentation application tool of FIG. 1; and FIG. 16 illustrates a computer implemented system for use with the process flow of FIG. 15, according to one or more embodiments shown and described herein.

DETAILED DESCRIPTION

In embodiments described herein, a presentation application tool for a streamlined presentation selection on a centralized platform aids to prevent against incompatibility of one or more presentation content, such as visual aids, between a plurality of devices, and to reduce or eliminate a delay time associated with transitioning between presentations. The presentation application tool described herein is configured to direct a user to an associated web address on a presentation device for display of a presentation on a presentation screen of the presentation device. The user is able to control the presentation from a separate user device. For example, the user is able to control content displayed on the presentation screen of the presentation device from the separate user device, which content may be audio-visual content including, but not limited to, PDF visuals, videos, images, slides, text, and the like. The user may further have speaking notes available and viewable to the user on the separate user device during the presentation in real-time, which speaking notes may be created within the presentation application tool by the user prior to the presentation. The user may mark off the speaking notes in real-time as used during the presentation. The user may further be shown a timer viewable to the user on the separate user device during the presentation to track a presentation length, which timer may be used when the student practices the presentation as well through the presentation application tool as described herein. The presentation application tool may additionally be configured for user access through user login through one or more user devices such that the user may create, build, and practice the presentation with use of the presentation application tool, as described in greater detail below.

Figure 1:
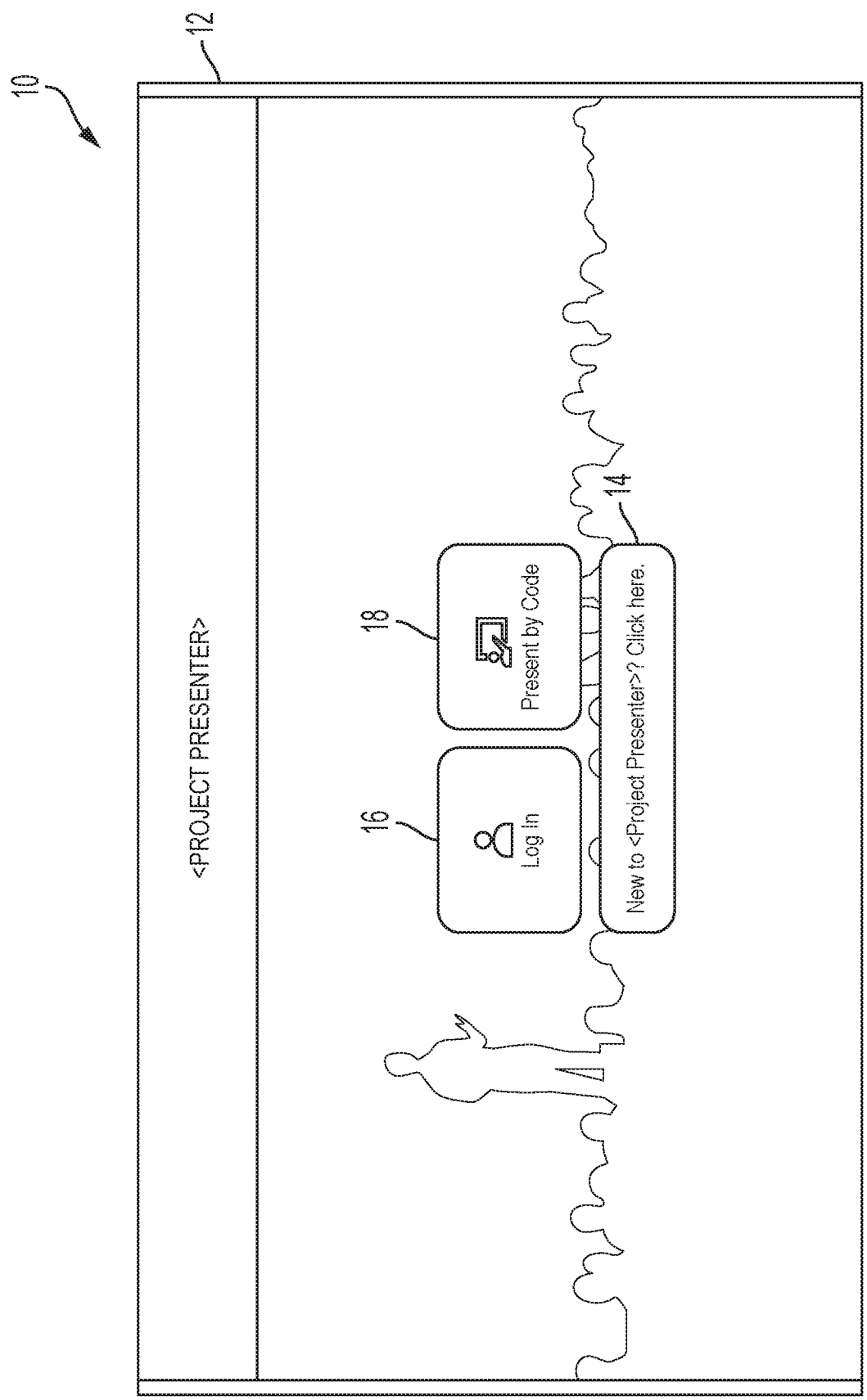
FIG. 1 illustrates a graphical user interface (GUI) view of a log-in option screen of a presentation application tool, according to one or more embodiments shown and described herein.

Referring initially to FIG. 1, a presentation application tool 10 is shown, which his embodied in a system 300 including a presentation module 312 and a verification module 316, which system 300 is described in greater detail below. The presentation application tool 10 includes a log-in option screen 12 on a graphical user interface (GUI) of the presentation application tool 10. The log-in option screen 12 may include a plurality of log-in options, such as a registration button 14, a log-in button 16, or a present by code button 18. In embodiments, the presentation application tool 10 may be a web-based application tool accessible on a GUI of a computing device 324 (FIG. 16), described in greater detail below. It is contemplated and within the scope of this disclosure that the computing device 324 may be a personal computer, a laptop device, a smart mobile device such as a smart phone or smart pad, or the like. A user may use the computing device 324 to access the presentation application tool 10 through first navigation to a website associated with the presentation tool, such as a website on the World Wide Web, to arrive at the log-in option screen 12. Such one or more computing devices 324 may be an administrative device, an active user device, and/or a presentation device as described herein. In the system 300, the administrative device 324 includes a GUI and is communicatively coupled to the presentation application tool 10. Further, the presentation device 324 is communicatively coupled to the presentation application tool 10, the active user device 324 is communicatively coupled to the presentation application tool 10, and the processor 304 is communicatively coupled to the presentation application tool 10.

If a user does not have an account associated with the presentation application tool 10, the user may sign up for an account through the registration button 14. When signing up through the registration button 14, the user may be asked to set up a user id and a user password. In embodiments, the user id may be a user email address associated with the user.

Figure 2:
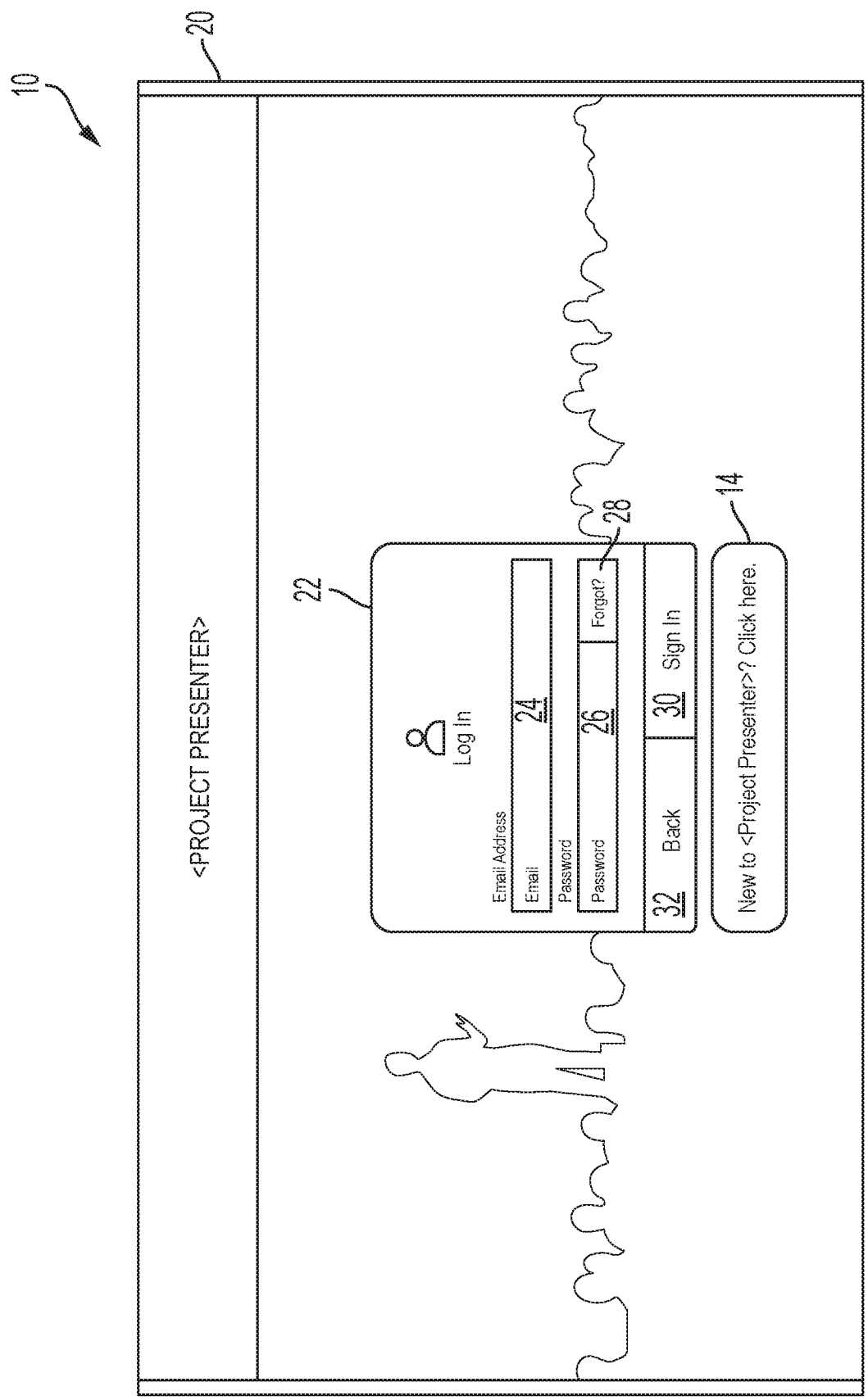
FIG. 2 illustrates a GUI view of a log-in entry screen of the presentation application tool of FIG. 1.

If a user has an account associated with the presentation application tool 10, the user may sign in through the log-in button 16 or the present by code button 18. Selection of the log-in button 16 leads the user to a log-in entry screen 20 of FIG. 2. The log-in entry screen 20 may include a log-in entry button 22, including an email address entry field 24, a password entry field 26, a forgot password button 28, a sign in button 30, a back button 32, and the registration button 14. For example, the forgot password button 28 is configured to aid a user who has forgotten a user password. Selection of the forgot password button 28 will guide the user through a series of instructions to authenticate the user and provide the user with the forgotten user password through use of the verification module 316. The back button 32 is configured to direct a user to the a previous screen, such as the log-in option screen 12 of FIG. 1. A user may enter authenticated log-in information, such as through the user email address entered into the email address entry field 24, the user password entered into the password entry field 26. The user may then select the sign in button 30 to proceed to the next screen once the user sign in information is verified through the verification module 316.

Figure 3:
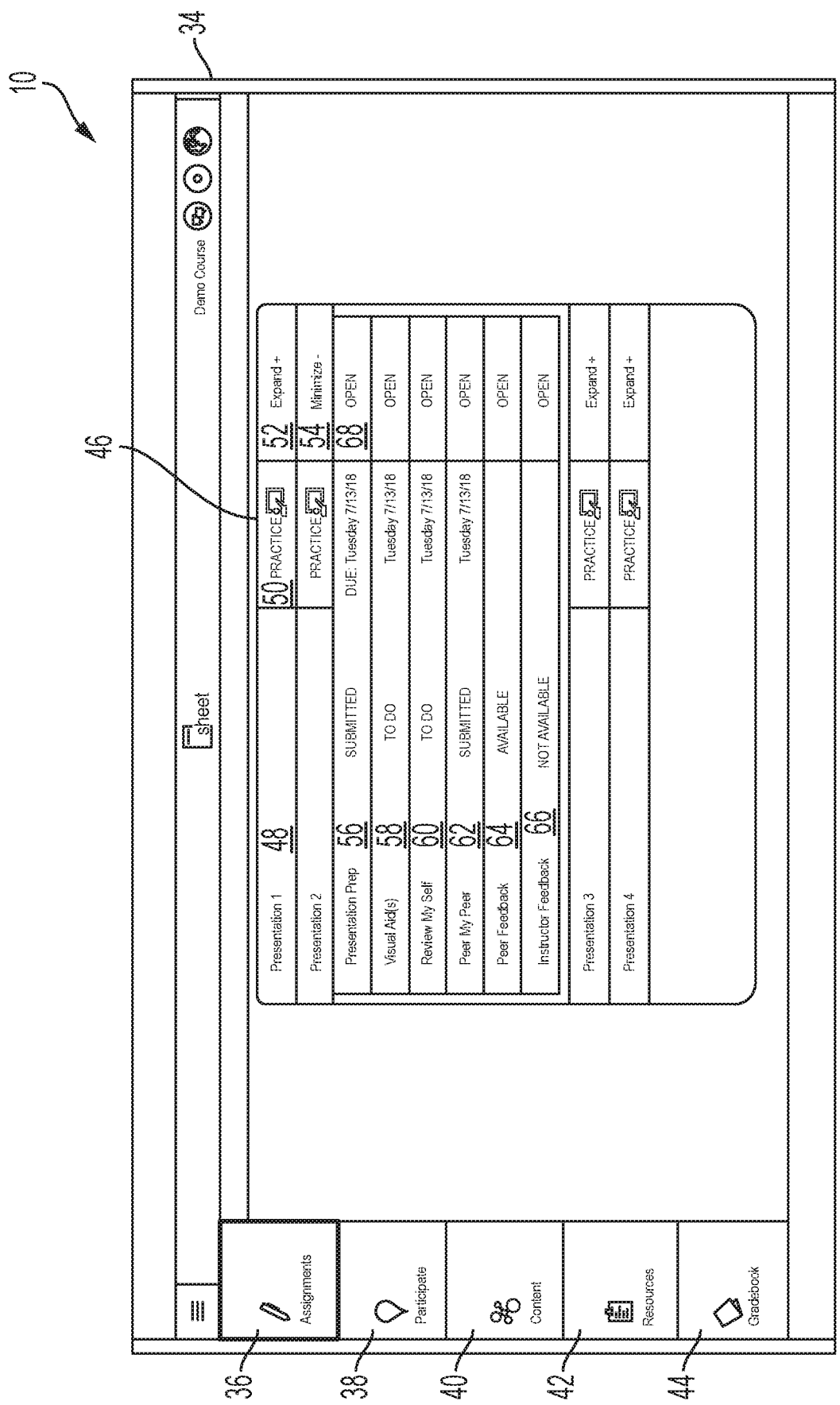
FIG. 3 illustrates a GUI view of an expanded presentation task screen of the presentation application tool of FIG. 1.

For example, the user may proceed after the user sign in information is verified to a task screen 34 of FIG. 3. The task screen 34 may include a banner screen option menu configured to present the user with options or direct the user to alternative screen. Such options on the banner screen option menu may include an assignments option 36, a participate option 38, a content option 40, a resources option 42, and a gradebook option 44. Selection of the participate option 38 may direct the user to a participation screen that may include, for example, a chat area, feedback forum, or like participation forum. Selection of the content option 40 may direct the user to a content screen that may include content configured to aid the user in one or more presentations. Such content may be provided by another user having access, such as an admin user, or be stored by the user that is logged into the account. Similarly, selection of the resources option 42 may direct the user to a resources screen that may include one or more resources for the user, such as links to articles or websites providing teaching suggestions regarding presentation skills and the like. Selection of the gradebook option 44 may present the user with a current and/or historical archiving of the user's grades for one or more particular classes associated with the presentation application tool 10. Selection of the assignments option 36 may direct the user to an assignments screen 70 of FIG. 4, described in greater detail below.

Referring again to FIG. 3, the user may further been shown an expanded presentation task screen 46 on the task screen 34. The expanded presentation task screen 46 may include one or more presentations 48 associated with a user account, a practice button 50 associated with each presentation 48 (e.g., Presentations 1-4 are shown), and either an expand button 52 for a presentation 48 that is not yet expanded (e.g., Presentations 1, 3, and 4) or a minimize button 54 for a presentation 48 that is expanded (e.g., Presentation 2). The presentation 48 including expanded Presentation 2 shows a plurality of expansion options, including a Presentation Preparation option 56, a Visual Aids option 58, a Review My Self option 60, a Peer My Peer option 62, a Peer Feedback option 64, and an Instructor Feedback option 66. Each of these options may include a status and/or a due date. By way of example, and not as a limitation, the Presentation Preparation option 56 indicates that preparation for Presentation 2 has been submitted by the user and shows an associated due date. Similarly, the Peer My Peer option 62 is indicated to be submitted and shows the associated due date. However, the Visual Aids option 58 and the Review My Self option 60 indicate an incomplete status through showing a "TO DO" status along with the associated due date(s). The Peer Feedback option 64 shows an "AVAILABLE" status, and the Instructor Feedback option 66 shows a "NOT AVAILABLE" status. The Instructor Feedback option 66 may be configured to be available after the user has presented an associated presentation, such as in a classroom setting, rather than practiced the presentation. It is contemplated and within the scope of this disclosure that this Instructor Feedback option 66 may not be included or used in other non-classroom settings, such as for business presentations and the like. Each of the plurality of expansion options also may include an Open button 68 to open the respective option, such as to edit, review, and/or prepare and submit material associated with the selected option.

Figure 4:
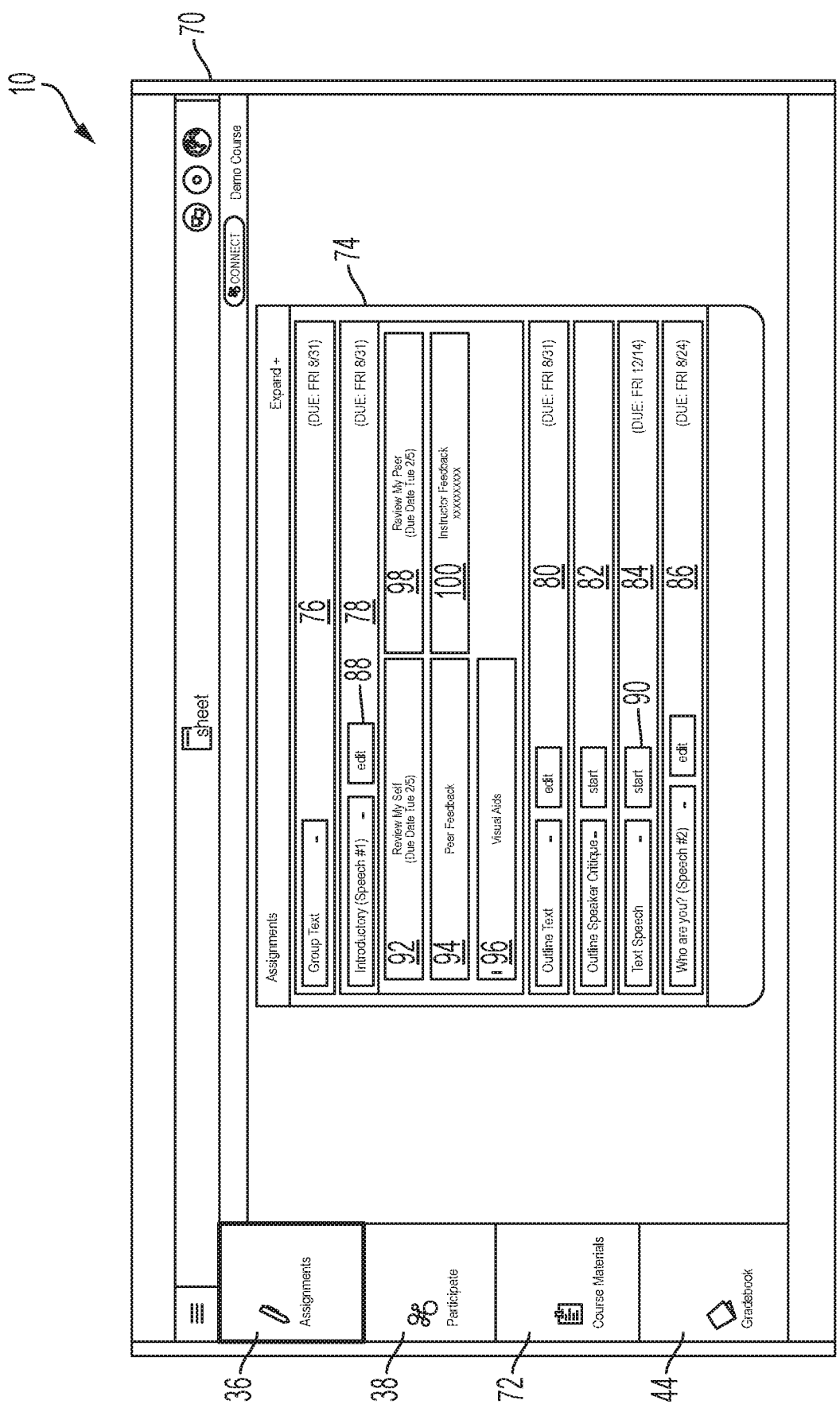
FIG. 4 illustrates a GUI view of an assignments screen of the presentation application tool of FIG. 1.

As described above, selection of the assignments option 36 may direct the user to the assignments screen 70 of FIG. 4. The assignments screen 70 may also include a banner screen option menu configured to present the user with options or direct the user to alternative screen. Such options on the banner screen option menu may include the assignments option 36, the participate option 38, a course materials option 40 to present the user with course materials associated with the user and/or one or more courses (such as in an educational institute setting), and the gradebook option 44. The assignments screen 70 may include an expanded assignments screen 74, which may include assignments and associated due dates for a user.

By way of example, and not as a limitation, FIG. 4 illustrates the expanded assignments screen 74 as including a Group Test assignment 76 with an associated due date, a first Speech assignment 78 with an associated due date, an Outline Test assignment 80 with an associated due date, an Outside Speaker Critique assignment 82 with an associated due date, a Test Speech assignment 84 with an associated due date, and a second Speech assignment 86 with an associated due date. The assignments may include a start button 88 or an edit button 90, such that a user may start on or edit a particular assignment. Further, the assignments may be expandable as indicated by a plus sign. In FIG. 4, the first Speech assignment 78 is expanded (as indicated by the minus sign) and includes a plurality of options associated with the first Speech assignment 78 and which may include a due date and/or status. For example, a Review My Self option 92 is shown with an associated due date, a Peer Feedback option 94 is shown, a Visual Aids option 96 is shown, a Review My Peer option 98 is shown with an associated due date, and an Instructor Feedback option 100 is shown as not yet available (e.g., not yet graded). Selections of an option will directed the user to a corresponding screen, such as described herein, associated with the particular option for the particular assignment for which the option was selected.

Figure 5:
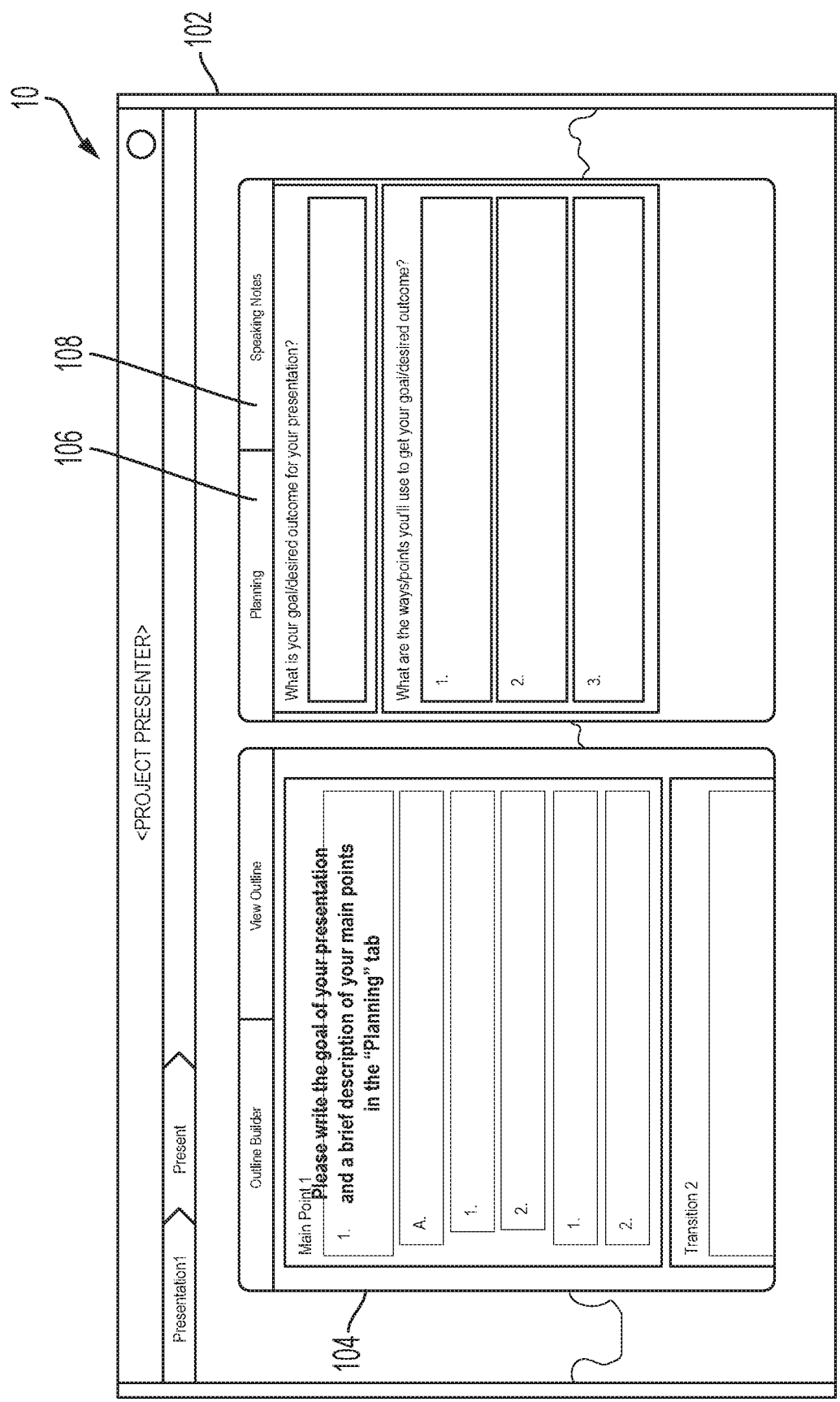
FIG. 5 illustrates a GUI view of a presentation planning screen of the presentation application tool of FIG. 1.

A user may option to return to or start at the expanded presentation task screen 46 on the task screen 34 of FIG. 3 to work on a presentation. As a non-limiting example, selection of an open button for the Presentation Preparation option 56 may lead the user to a presentation planning screen 102 of FIG. 5. In the example of FIG. 5, the presentation planning screen 102 is associated with a Presentation 1. The presentation planning screen 102 includes an Outline tool 104, a Planning tab 106, and a Speaking Notes tab 108. The Outline tool 104 includes an Outline Builder tab and a View Outline tab. In the Outline Builder tab, a user may build an outline for an associated presentation and may be instructed to input a goal of the associated presentation and a brief description of main points of the associated presentation in the Planning tab 106.

Figure 6:
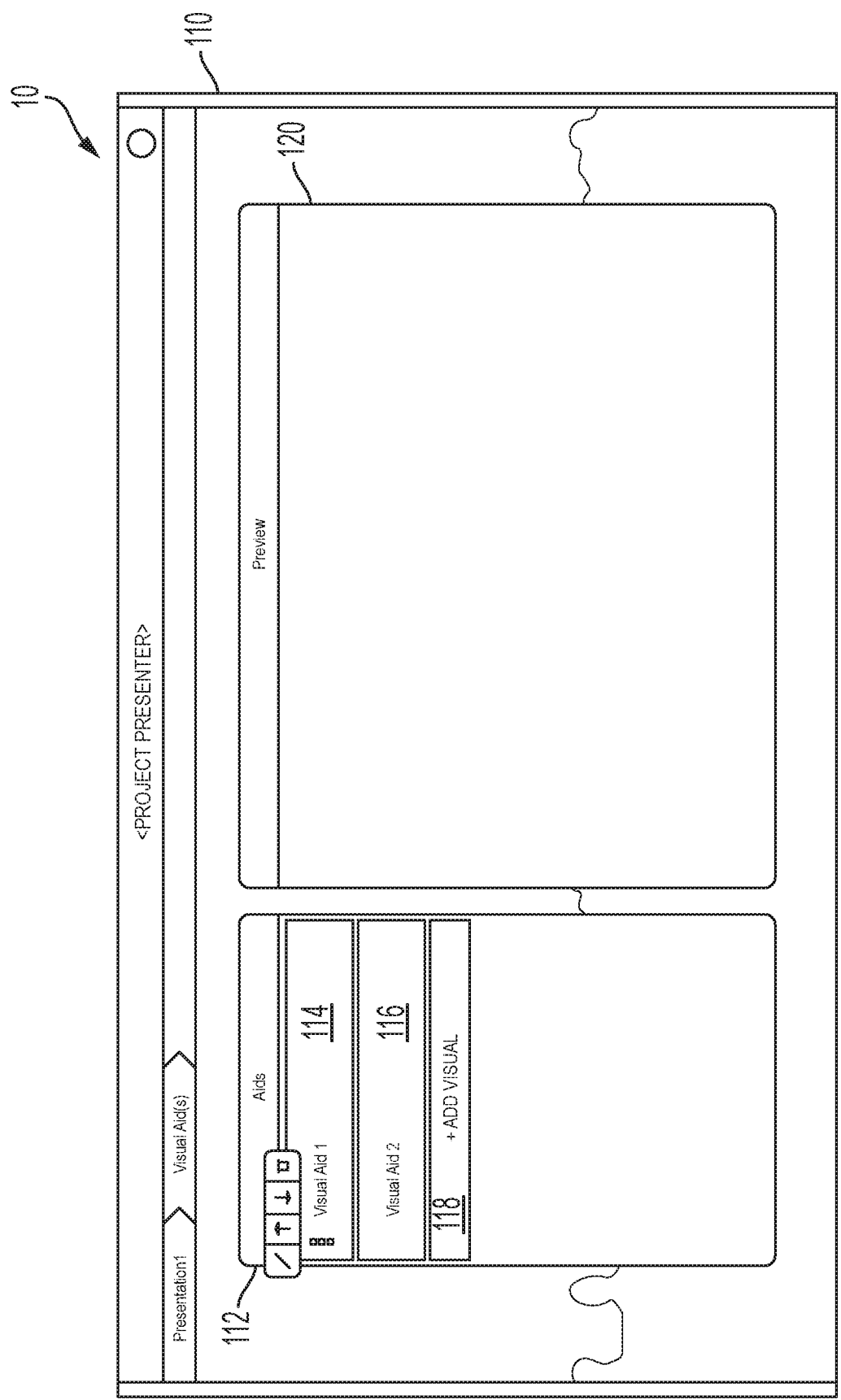
FIG. 6 illustrates a GUI view of a presentation visual aids screen of the presentation application tool of FIG. 1.

Alternatively, referring again to the expanded presentation task screen 46 on the task screen 34 of FIG. 3, selection of an open button for the Visual Aids option 58 may lead the user to a presentation visual aids screen 110 of FIG. 6. As a non-limiting example, the presentation visual aids screen 110 of FIG. 6 is associated with a selection of the Presentation 1 to add or edit visual edits associated with the Presentation 1. In the embodiment of FIG. 6, as shown on a Aids Input Screen 112, the Presentation 1 includes a Visual Aid 114 and a Visual Aid 116, which a user may select to edit. Selection of the Visual Aid 114 or the Visual Aid 116 may result in use of a Preview Screen 120 to preview the selected visual aid. The user may select an Add Visual option 118 as well to add a new visual aid to the Presentation 1.

Figure 7:
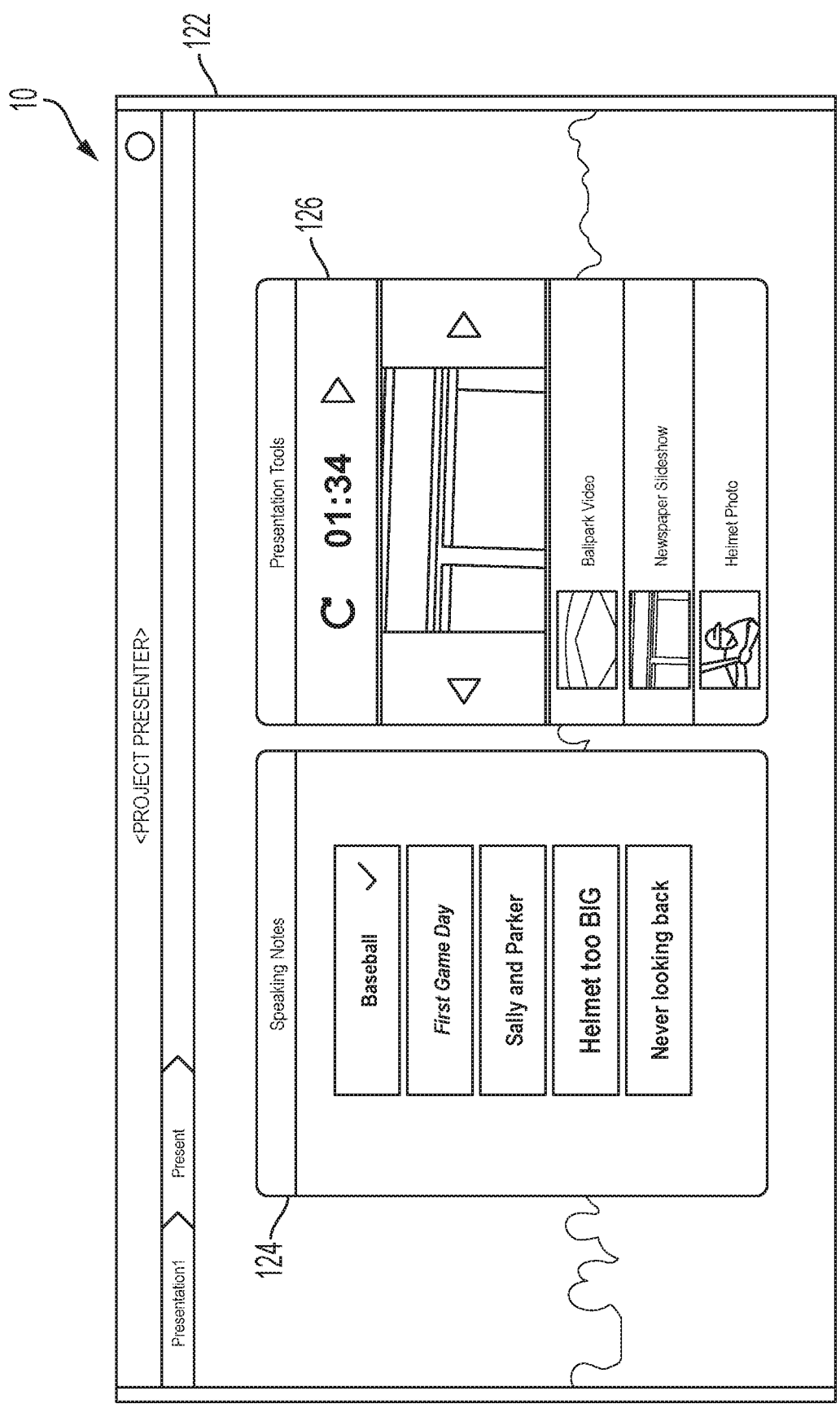
FIG. 7 illustrates a GUI view of a presentation tools and speaking notes screen of the presentation application tool of FIG. 1.

Referring again to the expanded presentation task screen 46 on the task screen 34 of FIG. 3, selection of the practice button 50 associated with a presentation 48 may lead the user to a presentation tools and speaking notes screen 112 of FIG. 7. For example, a user may practice a presentation and be shown the presentation tools and speaking notes screen 112 of FIG. 7 on a personal computing device (e.g., a smart mobile device) configured to control the presentation while the presentation slide view is presented on a separate computing device (e.g., a personal computer). Presentation tools and speaking notes screen 112 may include a Speaking Notes screen 124 and a Presentation tools screen 126. The presentation tools and speaking notes screen 112 of FIG. 7 is associated with the Presentation 1, and the user is being shown already input speaking notes associated with the Presentation 1 through the Speak Notes screen 124. The user is further shown presentation tools such as visual aids (that may be audio-visual, including, but not limited to, videos, photos, and/or photographs) associated with the Presentation 1 and selected speaking notes through the Presentation Tools screen 126. The user may control, edit, and or build content in the presentation application tool 10 such as how much of a video clip and which time portion are to be shown with an associated speaking note during the presentation.

Figure 8:
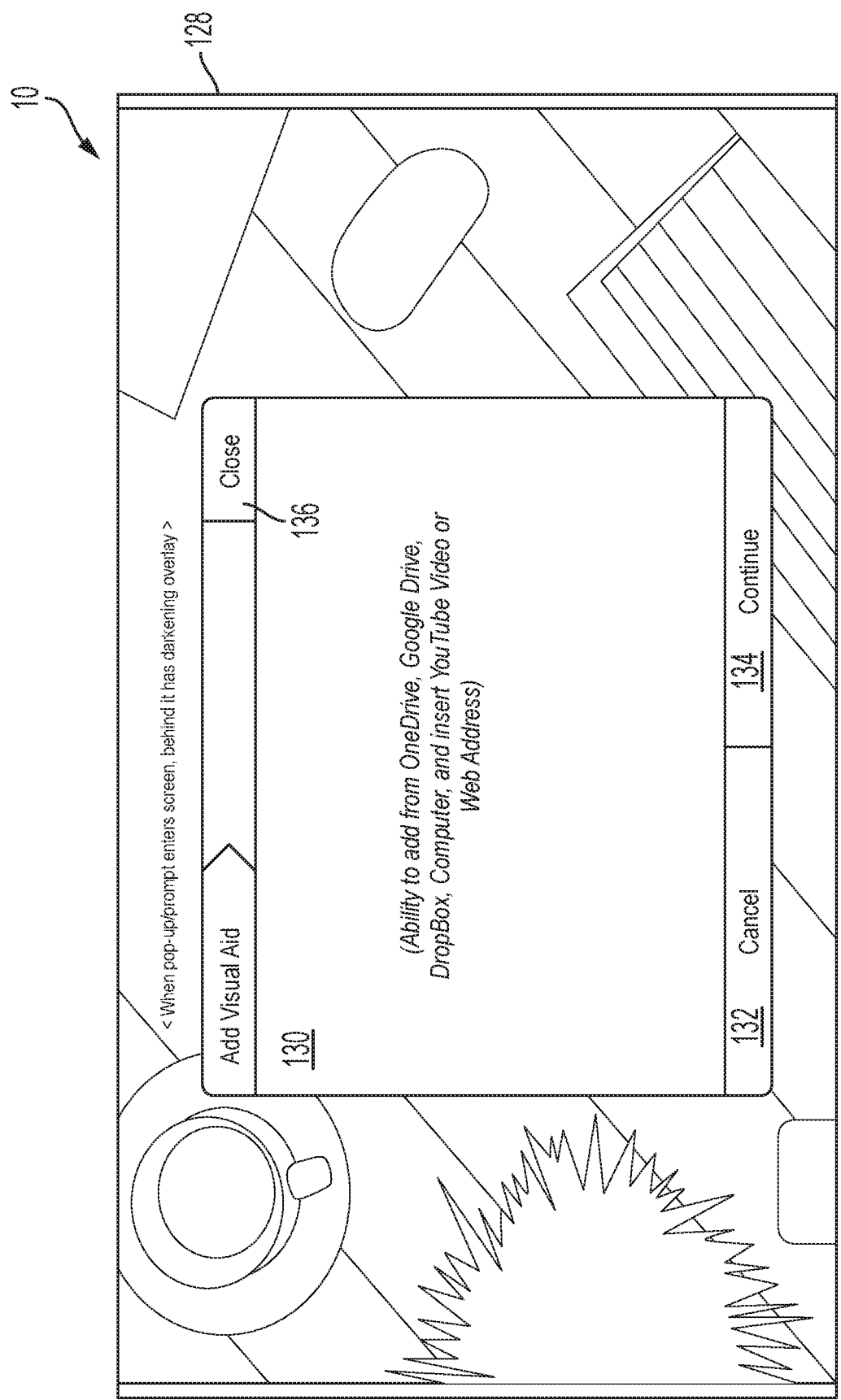
FIG. 8 illustrates a GUI view of a visual aids addition screen of the presentation application tool of FIG. 1.
Figure 9:
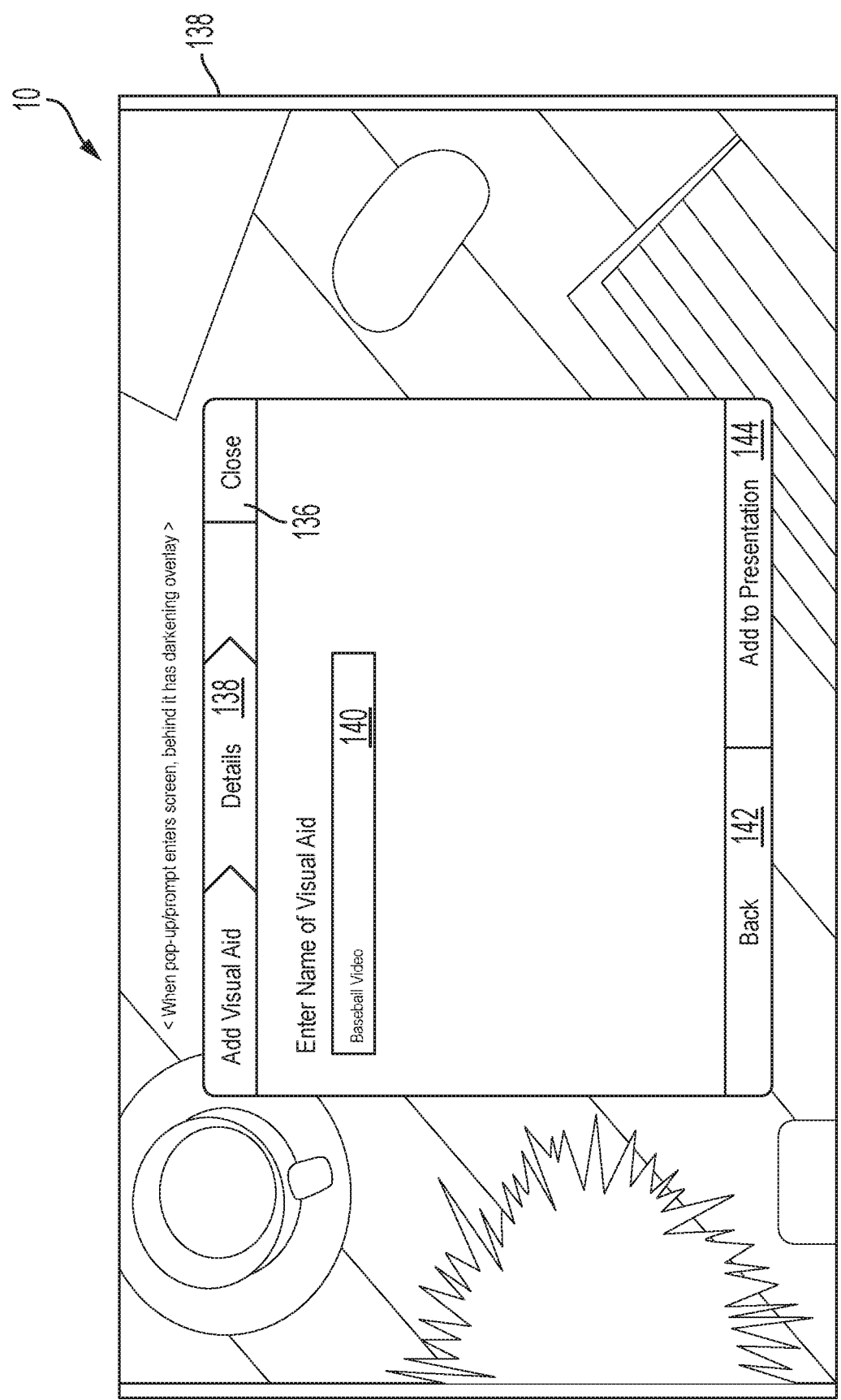
FIG. 9 illustrates a GUI view of a visual aids naming screen of the presentation application tool of FIG. 1.

Referring back again to FIG. 6, the user may select the Add Visual option 118 and be directed to a FIG. 8 illustrates a visual aids addition screen 128 of FIG. 8. The visual aids addition screen 128 may include an Add Visual Aid tab 130 in which a user may browse storage and/or website content to upload a visual aid, a Cancel button 132 to cancel the uploaded visual aid, a Continue button 134 to continue with the uploaded visual aid, and a Close button 136 to close the visual aids addition screen 128. Selection of the Continue button 134 may direct the user to a visual aids naming screen 138 of FIG. 9 that may include a Details tab 138 in which the user enters a name for the uploaded visual aid in a naming field 140. The user may select a Back button 142 to return to the visual aids addition screen 128 of FIG. 8, a Close button 136 to close the visual aids naming screen 138, or a Add to Presentation button 144 to add the named, uploaded visual to the associated presentation 48.

Figure 10:
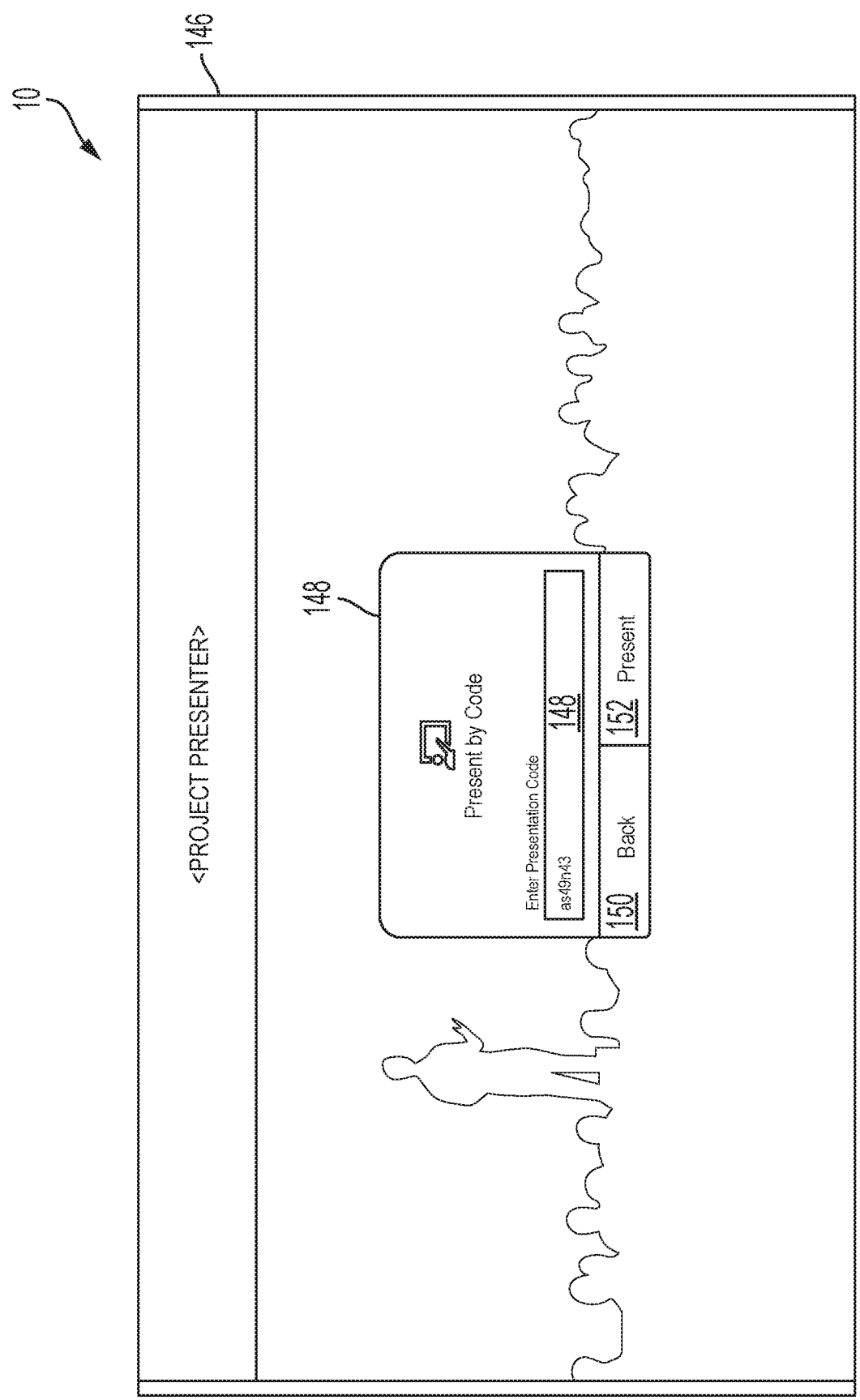
FIG. 10 illustrates a GUI view of a log-in code screen of the presentation application tool of FIG. 1.
Figure 11:
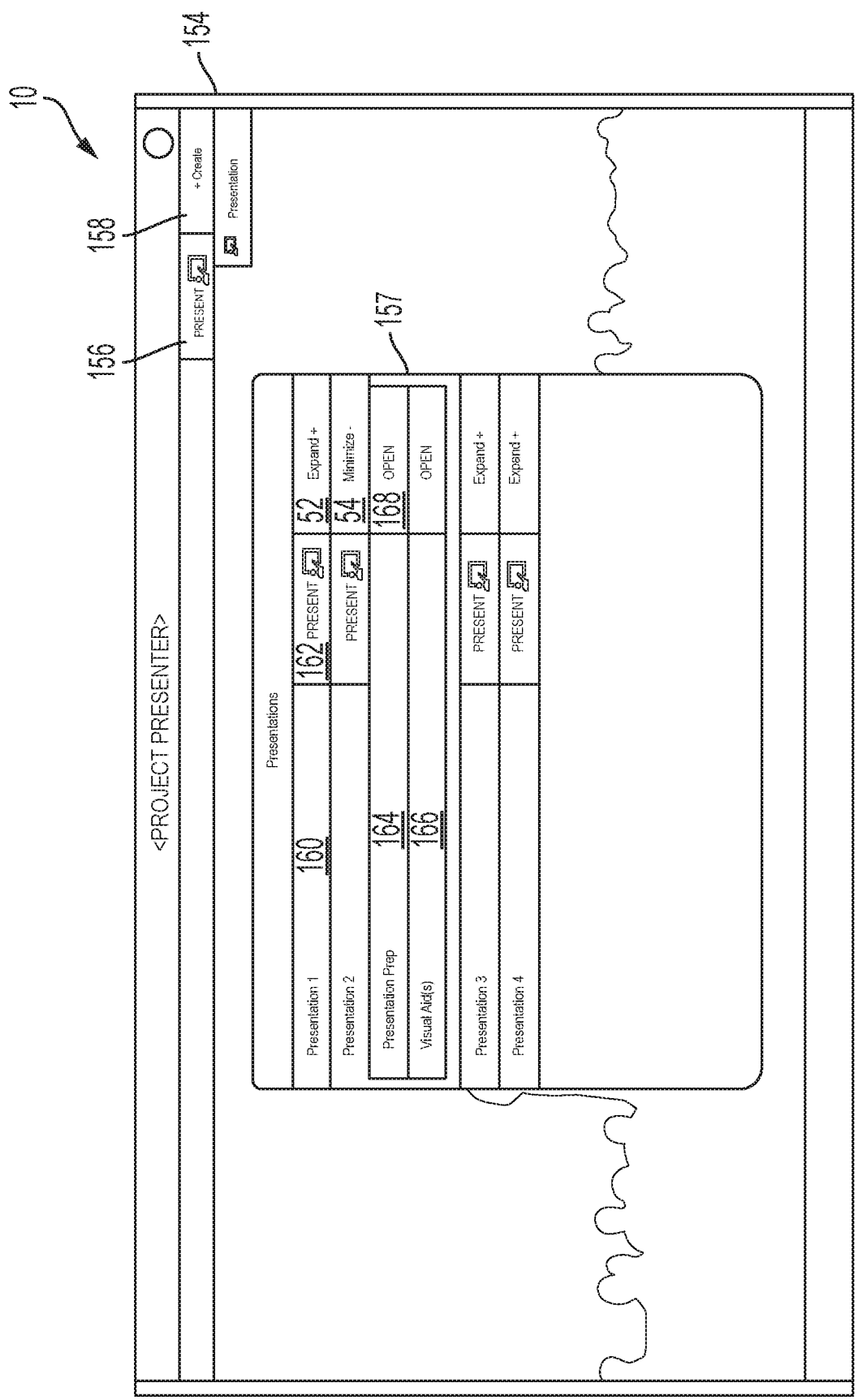
FIG. 11 illustrates a GUI view of a presentations control screen of the presentation application tool of FIG. 10.

When a user is to present a select presentation 48, an admin control user may input a code to provide the user with control to present the select presentation 48, as will be described in greater detail below with respect to FIG. 15. For example, the admin control user may go to the log-in option screen 12 of FIG. 1 (such as through access via an associated website) and select the present by code button 18. The admin control user is then directed to a log-in code screen 146 as shown in FIG. 10. The admin control user may input a code in a presentation code field 148 that is associated with one or more presentations 48 and select a Present button 152. Alternatively, a user may select a Back button 150 to return to the log-in option screen 12 of FIG. 1. Selection of the Present button 152 will lead the user to a presentations control screen 154 of FIG. 11 if the code is authenticated as associated with one or more presentations through the verification module 316. Referring to FIG. 11, through the presentations control screen 154, a user may select a Create Presentation button 158 to create a presentation. Alternatively, the user may select a Present Button 156 to present an expanded present screen 157. The expanded present screen 157 may include a listing of one or more associated presentations 160 associated with the authenticated code (e.g., Presentations 1-4). Each presentation 160 may be shown with a Present button option 162 to start the respective presentation and an expand button 52 or a minimize button 54 as described herein. As a non-limiting example, Presentation 2 is shown as expanded, with a Presentation Preparation option 164 shown along with an open button 168 to open the associated presentation preparation tools as well as a Visual Aids option 166 and open button 168 to open the associated visual aids tools.

Figure 12:
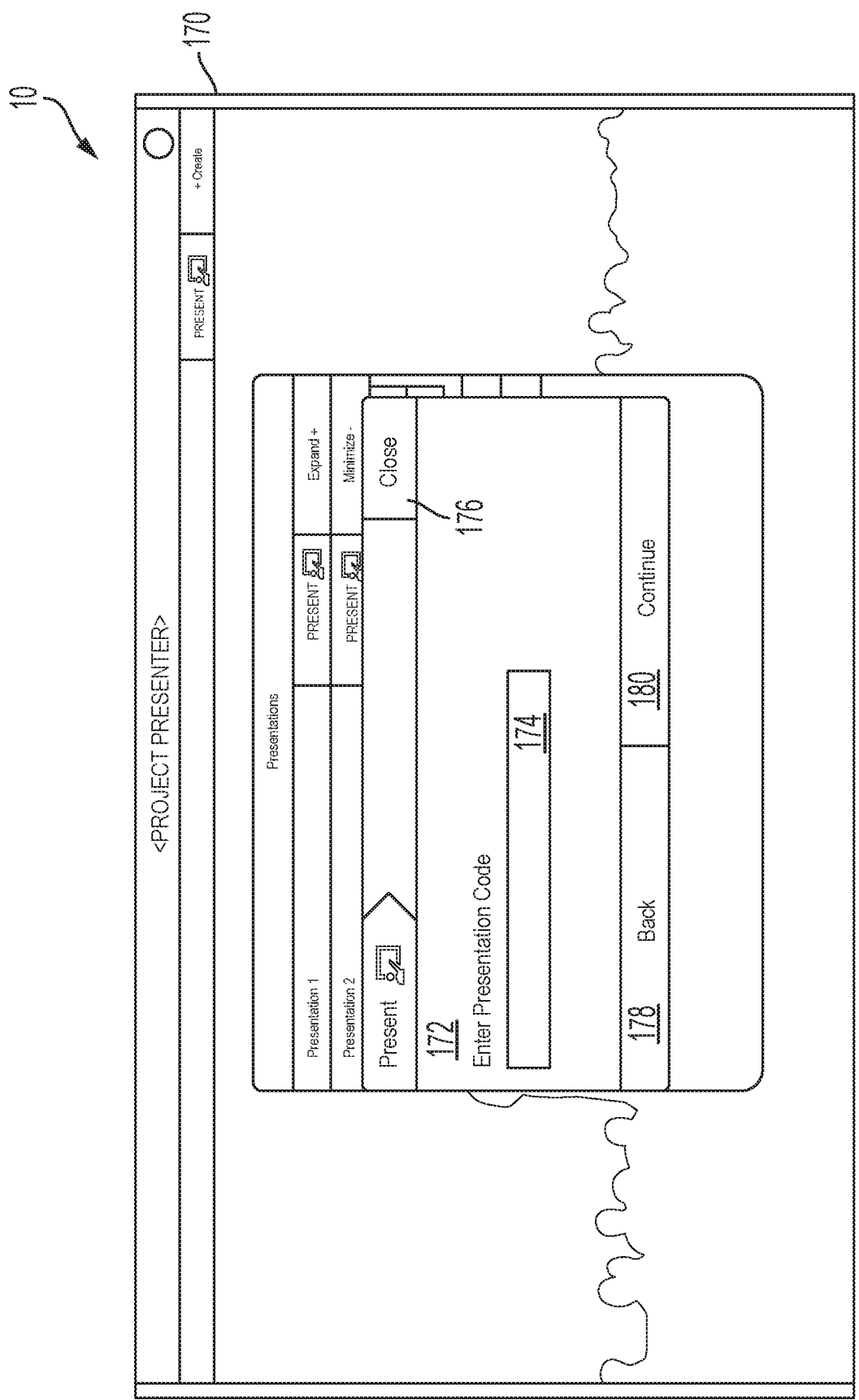
FIG. 12 illustrates a GUI view of an expanded presentation code entry screen of the presentation application tool of FIG. 11.
Figure 13:
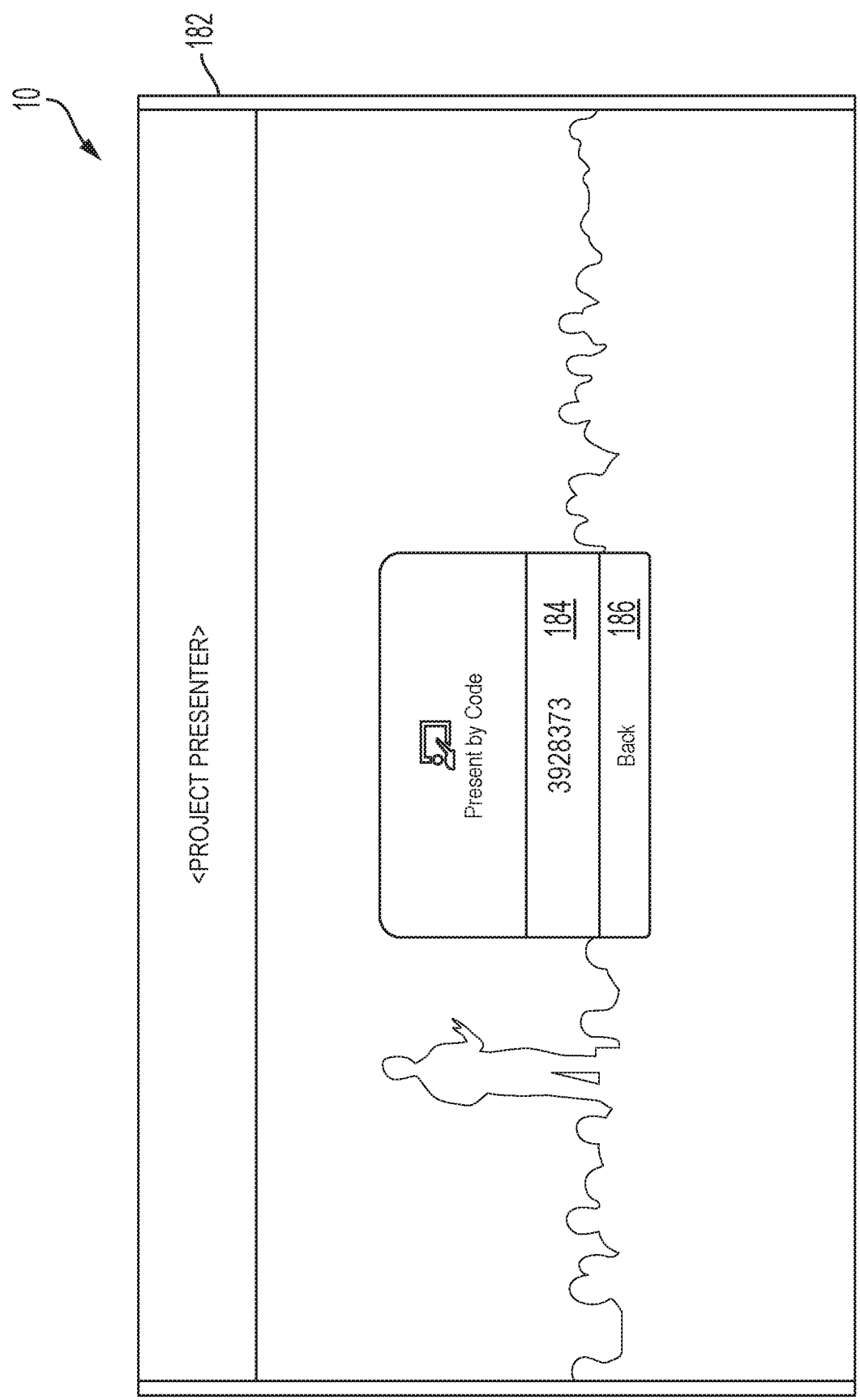
FIG. 13 illustrates a GUI view of an entered presentation code screen of the presentation application tool of FIG. 12 with an entered code.

Selection of the Present button option 162 of a selected presentation will lead the user to an expanded presentation code entry screen as shown in FIG. 12, in which the user will enter a code associated with the selected presentation to start presenting the selected presentation if the code is authenticated through the verification module 316. For example, the admin user may enter the code associated with the selected presentation to give another user rights to access and control the presentation on the presentation application tool 10 and start presentation. The admin user may select a Close option 176, a Back option 178, or a Continue option 180 to access the selected presentation. Such an admin user may be a classroom instructor, and the presenting user may be a student able to access a presentation that the student has prepared to present to a classroom on a GUI of a first device, such as a screen facing an audience, and control the presentation with a second device, such as a smart mobile device of the presenting user. FIG. 13 illustrates an example of an entered presentation code screen 182 with an entered code 184 and a Back button option 186. Upon verification of the entered code, the selected presentation may appear and a user set as an active user to control and present the selected presentation.

Figure 14:
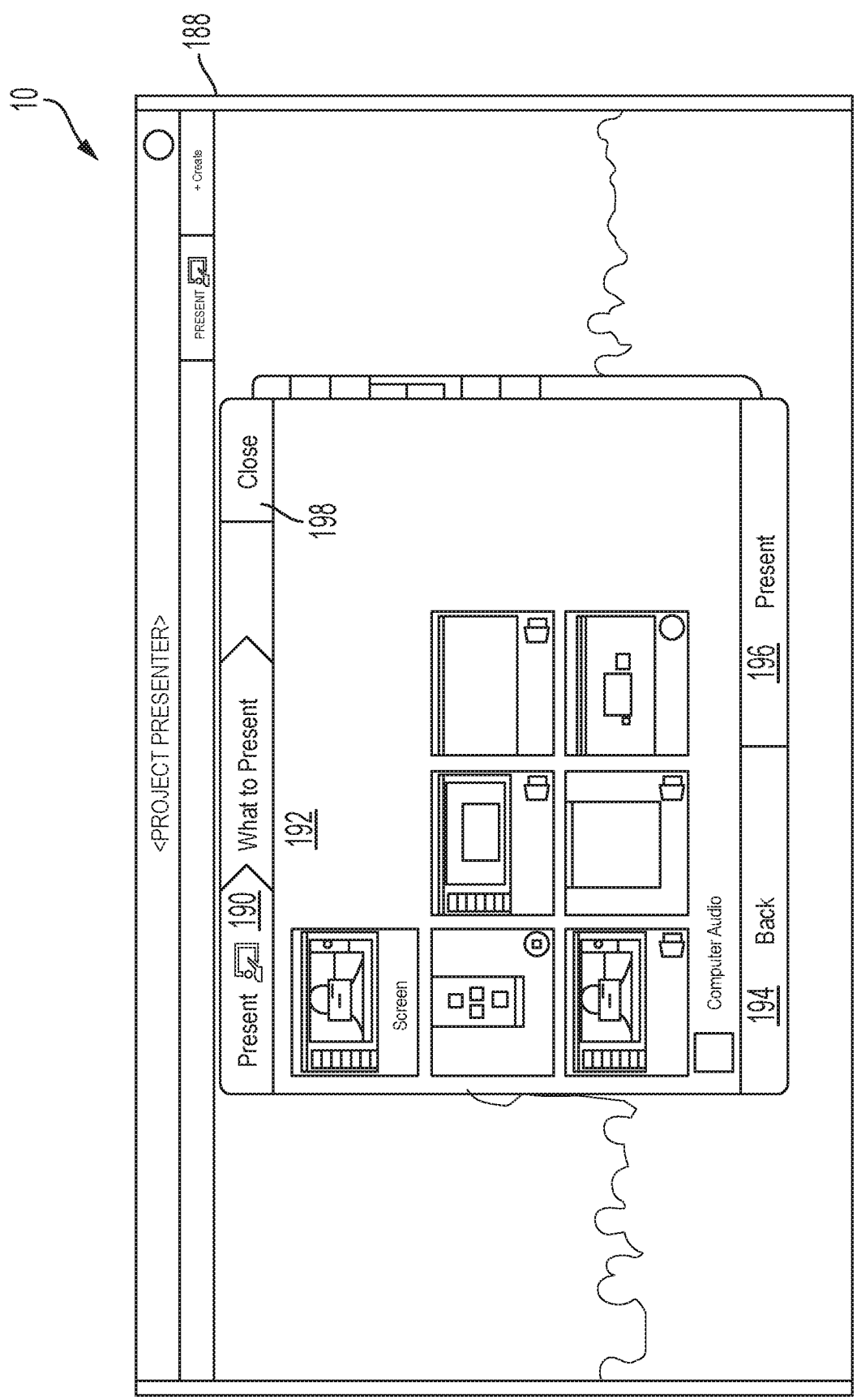
FIG. 14 illustrates a GUI view of a presentation screen associated with the entered code of the presentation application tool of FIG. 13.

As a non-limiting example, FIG. 14 illustrates an embodiment of a presentation screen 188 associated with the entered code 184 of FIG. 13. The presentation screen 188 may include a Present option 190 to start the selected presentation, a What to Present tab 192 to aid the user in controlling the presented content of the presentation, a Back button option 194, a Present button option 196 on the What to Present tab 192 to launch the selected content and presentation, and a Close button option 198.

FIG. 15 illustrates an embodiment of a process 200 for use of the presentation application tool 10 of FIGS. 1-14. In block 202, a control code that is associated with an administrator (e.g., "admin") control is input on an admin device (e.g., an administrative device) that is linked with a presentation device for use to present a selected presentation as described herein. For instance, the control code associated with an administrative control is input via the presentation application tool 10 and a GUI of the administrative device. The presentation device may be controlled via the administrative device based on the control code. The verification module 316, as described in greater detail below, may verify and authenticate the control code. The control code may be verified to generate a successful verification, and the presentation device may be controlled via the administrative device based on the successful verification of the control code.

In block 204, an active user to present the selected presentation on a presentation screen of the presentation device is set by the admin control such that the active user is in control of a present mode associated with the selected presentation on the presentation device. Thus, the active user is set through the administrative control via the GUI of the administrative device. The active user may be in control of a present mode and an active user device.

In block 206, an active user device (e.g., smart mobile device) is associated with the present mode and the presentation device such that the active user may use the active user device to control the present mode and the selected presentation on the presentation device. Hence, the active user device is associated with the present mode and the presentation device. The present mode is configured to control the presentation device. The presentation module 312, described in greater detail below and which embodies the presentation application tool 10 as described herein, implements the present mode such that the active user present presentation the selected presentation and control the selected presentation through the active user device. In block 208, the presentation screen of the presentation device is controlled through the active user device, and the active user proceeds to present the selected presentation on the presentation screen of the presentation device. A presentation screen of the presentation device may thus be controlled in the present mode through the active user device.

In embodiments, the active user device may include a smart mobile device as described herein. The process 200 may further include selecting a selected presentation via the active user device, and presenting via the active user device the selected presentation on the presentation screen of the presentation device. A code associated with the selected presentation may be entered, the code may be authenticated to generate an authenticated code, and the selected presentation may be presented via the active user device on the presentation screen of the presentation device based on the authenticated code.

In further embodiments, the administrative device is controlled by one or more administrative user. As a non-limiting example, the administrative device is controlled by an administrative user who is the active user. Alternatively, the administrative device is controlled by an administrative user separate from the active user. In an embodiment, the administrative user is an instructor, and the active user is a student.

FIG. 16 illustrates a computer implemented system 300 for use with the process 200 of FIG. 15. Referring to FIG. 16, a non-transitory system 300 for implementing a computer and software-based method to utilize system presentation application tools for preparing and presentation a select presentation as described herein is illustrated as being implemented along with using a graphical user interface (GUI) that is accessible at a user workstation (e.g., a computing device 324), for example. The system 300 comprises a communication path 302, one or more processors 304, a non-transitory memory component 306, a presentation module 312, which is embodied in the presentation application tool 10, database 314, a verification component 316, a network interface hardware 318, a network 322, a server 320, and the computing device 324. The various components of the system 300 and the interaction thereof will be described in detail below.

While only one application server 320 and one user workstation computing device 324 is illustrated, the system 300 can comprise multiple application servers containing one or more applications and workstations. In some embodiments, the system 300 is implemented using a wide area network (WAN) or network 322, such as an intranet or the Internet. The workstation computing device 324 may include digital systems and other devices permitting connection to and navigation of the network. Other system 300 variations allowing for communication between various geographically diverse components are possible. The lines depicted in FIG. 16 indicate communication rather than physical connections between the various components.

The system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

The system 300 of FIG. 16 also comprises the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated system 300 further comprises the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 16, as noted above, the system 300 comprises the display such as a GUI on a screen of the computing device 324 for providing visual output such as, for example, information, the screens described herein (e.g., FIGS. 1-14), graphical reports, messages, or a combination thereof. The display on the screen of the computing device 324 is coupled to the communication path 302 and communicatively coupled to the processor 304. Accordingly, the communication path 302 communicatively couples the display to other modules of the system 300. The display can comprise any medium capable of transmitting an optical output such as, for example, a cathode ray tube, light emitting diodes, a liquid crystal display, a plasma display, or the like. Additionally, it is noted that the display or the computing device 324 can comprise at least one of the processor 304 and the memory component 306. While the system 300 is illustrated as a single, integrated system in FIG. 16, in other embodiments, the systems can be independent systems.

The system 300 comprises the presentation module 312 as described above and the verification component 316 for verifying login and/or code information associated with a user and/or one or more presentations with respect to the presentation module 312. The presentation module 312 and the verification component 316 are coupled to the communication path 302 and communicatively coupled to the processor 304. As will be described in further detail below, the processor 304 may process the input signals received from the system modules and/or extract information from such signals.

The system 300 comprises the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can comprise a communication transceiver for sending and/or receiving data according to any wireless communication standard. For example, the network interface hardware 318 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 16, data from various applications running on computing device 324 can be provided from the computing device 324 to the system 300 via the network interface hardware 318. The computing device 324 can be any device having hardware (e.g., chipsets, processors, memory, etc.) for communicatively coupling with the network interface hardware 318 and a network 322. Specifically, the computing device 324 can comprise an input device having an antenna for communicating over one or more of the wireless computer networks described above.

The network 322 can comprise any wired and/or wireless network such as, for example, wide area networks, metropolitan area networks, the Internet, an Intranet, satellite networks, or the like. Accordingly, the network 322 can be utilized as a wireless access point by the computing device 324 to access one or more servers (e.g., a server 320). The server 320 and any additional servers generally comprise processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

In embodiments, the presentation application tool 10 is configured to provide a centralized platform to streamline transitions between presentations in a setting and prevent against incompatibility of one or more presentation visual aid content between a plurality of devices, which reduces or eliminates a delay time associated with transitioning between presentations. Such a reduction in the delay time assists with improving latency, efficiency, and processing time associated with presenting the presentation through use of the presentation application tool. Further, preparation of the presentation through the same presentation application tool 10 used to present the application allows for pre-curation of presentation content, such as visual aids to be displayed via, for example, the internet connection associated with the presentation application tool 10 through the associated website. The centralized presentation application tool 10 is able to provide for a quick and smooth presentation start and efficient transitioning between presenters with a reduced delay time between presentations. While use of an internet connection and associated website for the presentation application tool 10 is described herein, it is contemplated and within the scope of this disclosure that the presentation application tool 10 may be an application feature downloaded to a plurality of devices with content accessible through user login accounts as described herein.

In presentation settings, without use of the presentation application tool 10 as described herein, an obstacle in transitioning between presentations usually involves different presenters separately loading respective presentations to a presentation device resulting in a delay between presentations. Further, such separate loading may result in incompatibility from their presentation content created in different devices and programs when displayed on the presentation device. The presentation application tool 10 described herein is configured to integrate presentation content such as slides, images, videos, and the like of the one or more presenters into the centralized presentation application tool 10.

The presentation application tool 10 may be configured for use through a many to one code control configuration, a many to many code control configuration, a one to one code control configuration, or combinations thereof. The many to one code control configuration may include more than one of the one or more administrative users and one active user as the active user. The many to many code control configuration may include more than one of the one or more administrative users and more than one active user as the active user. Further, the one to one code control configuration comprises one of the one or more administrative users and one active user as the active user.

As a non-limiting example of a many to one control configuration, and as described herein, an admin user is able to use a device logged into an admin presenter account through, for example, an admin code, to activate a presenter as an active presenter user and automatically and seamlessly present the active presenter user of a current presentation with previously uploaded content such as visual aids for the current presentation. Thus, the presentation application tool may be configured to verify an admin code and an activation of a presenter as an active presenter user to control a current presentation on a presentation device screen through a user device. For example, the admin user may be an instructor in a classroom setting, and the active presenter user may be a student ready to present the current presentation for instructor and audience feedback and grading. The instructor may input the admin code on an instructor device to launch the presentation application tool 10, and activate a student as the active user presenter of the current presentation, which is associated with the student. The instruct thus is able to use the presentation application tool 10 to provide presentation control to the student and an associated student device through such activation such that the student can control the current presentation on the presentation screen of the presentation device through the associated student device. The student as the active presenter user may select or tap on a button on the presentation application tool 10 interface displayed on the associated student device to launch and control the current presentation on the presentation screen of the presentation device in real-time. The student may curate one or more visual aids associated with the current presentation prior to the presentation, such as what section of a video to play, start, and stop on at a certain time during the presentation, and may practice such features using the same controls, tools, and/or devices that the student will use when presenting the current presentation on the presentation device. The instructor and/or audience may provide such feedback and grading regarding the current presentation directly into the presentation application tool 10.

As a non-limiting example of a many to many control configuration, such as for a shared presentation, many users may control the presentation through a shared code input into the presentation application tool 10 and all act as both admin users and active presenter users. As a non-limiting example of a one to one control configuration, such as in a stand-alone business presentation setting, the admin user and the active presenter user may be the same person. For example, the active presenter user is the one to input the admin code, which may be set to concurrently act to activate the active presenter user as the presenter through the presentation application tool 10.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of using a presentation application tool, the method comprising:
    inputting a control code associated with an administrative control via the presentation application tool and a graphical user interface (GUI) of an administrative device;
    controlling a presentation device via the administrative device based on the control code;
    setting an active user through the administrative control via the GUI of the administrative device, wherein the active user is in control of a present mode and an active user device;
    associating the active user device with the present mode and the presentation device, the present mode configured to control the presentation device;
    selecting a selected presentation comprising at least a visual digital slide presentation via the active user device;
    entering a code associated with the selected presentation;
    authenticating the code to generated an authenticated code;
    presenting via the active user device the selected presentation on the presentation screen of the presentation device based on the authenticated code; and
    controlling the at least a visual digital slide presentation associated with the active user on a presentation screen of a user interface of the presentation device in the present mode through the active user device.

2. The method of claim 1, further comprising:
    verifying the control code to generate a successful verification; and
    controlling the presentation device via the administrative device based on the successful verification of the control code.

3. The method of claim 1, wherein the active user device comprises a smart mobile device.

4. The method of claim 1, wherein the administrative device is controlled by an administrative user who is the active user.

5. The method of claim 1, wherein the administrative device is controlled by an administrative user separate from the active user.

6. The method of claim 5, wherein the administrative user is an instructor, and the active user is a student.

7. The method of claim 1, wherein the presentation application tool is configured for use through a many to one code control configuration, a many to many code control configuration, a one to one code control configuration, or combinations thereof.

8. The method of claim 7, wherein:
    the administrative device is controlled by one or more administrative users;
    the many to one code control configuration comprises more than one of the one or more administrative users and one active user as the active user;
    the many to many code control configuration comprises more than one of the one or more administrative users and more than one active user as the active user; and
    the one to one code control configuration comprises one of the one or more administrative users and one active user as the active user.

9. A method of using a presentation application tool, the method comprising:
    inputting a control code associated with an administrative control via the presentation application tool and a graphical user interface (GUI) of an administrative device, wherein the administrative device is controlled by one or more administrative users;
    verifying the control code to generate a successful verification;
    controlling a presentation device via the administrative device based on the control code and the successful verification;
    setting an active user through the administrative control via the GUI of the administrative device, wherein the active user is in control of a present mode and an active user device;
    associating the active user device with the present mode and the presentation device, the present mode configured to control the presentation device;

selecting a selected presentation comprising at least a visual digital slide presentation via the active user device;
entering a code associated with the selected presentation;
authenticating the code to generated an authenticated code;
presenting via the active user device the selected presentation on the presentation screen of the presentation device based on the authenticated code; and
controlling the at least a visual digital slide presentation associated with the active user on a presentation screen of a user interface of the presentation device in the present mode through the active user device.

10. The method of claim 9, wherein the presentation application tool is configured for use through a many to one code control configuration, a many to many code control configuration, a one to one code control configuration, or combinations thereof.

11. The method of claim 10, wherein:
the many to one code control configuration comprises more than one of the one or more administrative users and one active user as the active user;
the many to many code control configuration comprises more than one of the one or more administrative users and more than one active user as the active user; and
the one to one code control configuration comprises one of the one or more administrative users and one active user as the active user.

12. A system, the system comprising:
a presentation application tool;
an administrative device comprising a graphical user interface (GUI) and communicatively coupled to the presentation application tool;
a presentation device communicatively coupled to the presentation application tool;
an active user device communicatively coupled to the presentation application tool;
a processor communicatively coupled to the presentation application tool; and
a non-transitory computer-readable memory storing instructions that, when executed by the processor, cause the processor to:
input a control code associated with an administrative control via the presentation application tool and the GUI of the administrative device;
control the presentation device via the administrative device based on the control code;
set an active user through the administrative control via the GUI of the administrative device, wherein the active user is in control of a present mode and the active user device;
associate the active user device with the present mode and the presentation device, the present mode configured to control the presentation device;
select a selected presentation comprising at least a visual digital slide presentation via the active user device;
enter a code associated with the selected presentation;
authenticate the code to generated an authenticated code;
present via the active user device the selected presentation on the presentation screen of the presentation device based on the authenticated code; and
control the at least a visual digital slide presentation associated with the active user on a presentation screen of a user interface the presentation device in the present mode through the active user device.

13. The system of claim 12, further comprises instructions that, when executed by the processor, cause the processor to:
verify the control code to generate a successful verification; and
control the presentation device via the administrative device based on the successful verification of the control code.

14. The system of claim 12, wherein the presentation application tool is configured for use through a many to one code control configuration, a many to many code control configuration, a one to one code control configuration, or combinations thereof.

15. The system of claim 14, wherein:
the administrative device is controlled by one or more administrative users;
the many to one code control configuration comprises more than one of the one or more administrative users and one active user as the active user;
the many to many code control configuration comprises more than one of the one or more administrative users and more than one active user as the active user; and
the one to one code control configuration comprises one of the one or more administrative users and one active user as the active user.

* * * * *